Patented Apr. 21, 1936

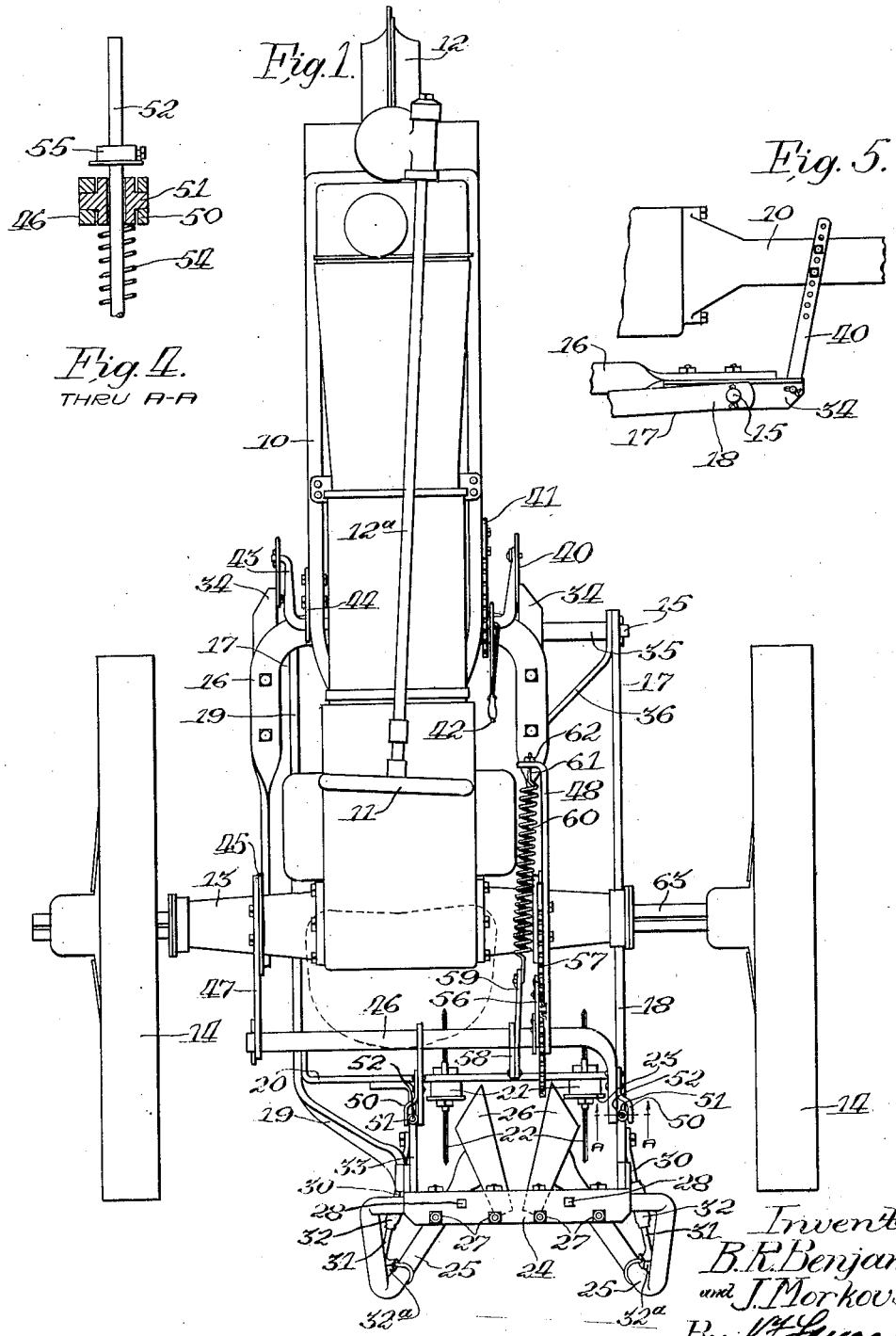

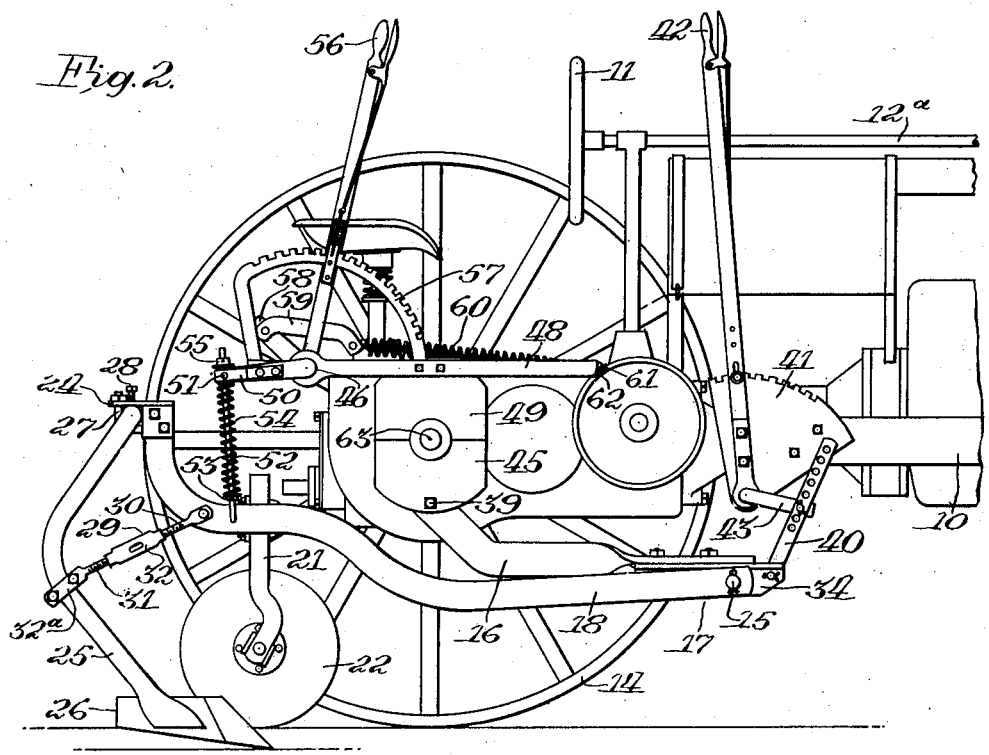

2,037,960

UNITED STATES PATENT OFFICE 2,037,960

TRACTOR BEET HARVESTER

Bert R. Benjamin, Oak Park, and James Morkovski, Canton, Illinois, assignors to International Harvester Company, a corporation of New Jersey Application October 6, 1934, Serial No. 747,168

17 Claims. (Cl. 55—106)

The invention herein described relates to tractor propelled implements and more specifically to beet harvesting attachments for tractors. Crops such as sugar beets, beets, onions or turnips, or other similar crops, which are planted in rows and which have to be lifted from the earth before they are gathered, may be harvested by this implement.

The main objects of the invention are to provide a construction of beet harvesting means and a manner of connecting same to the tractor particularly adapted for location of the harvesting unit at one side of the body of a row crop or tricycle type tractor, where its operation may be viewed by the driver of the tractor, and to be so connected to supporting means on the tractor as to limit movement of the implement to a vertical plane extending longitudinally of the tractor and to maintain it in substantially level position during such movements. The harvesting implement may be mounted on either side of the tractor, although it is here shown as being mounted on the right side of the tractor.

A further object of the invention is to provide a single row harvesting implement which will accommodate various spacings of rows found in different sections of the world by offsetting either of the rear tractor wheels on the axle of the tractor.

These and other objects are attained by providing a narrow longitudinally extended frame of novel form for the beet harvesting means and by connecting this frame to the tractor through draft linkage and lifting and lowering means constructed and arranged to govern the movements of the implement, all as more specifically described and shown in the following specification and drawings, and defined in the claims.

In the drawings:

Figure 1 is a plan view of a tractor and beet harvester combination embodying the invention;

Figure 2 is a side elevation of the same, with one of the wheels removed;

Figure 3 is a rear elevation of the same;

Figure 4 is a section through A—A shown on Figure 1; and,

Figure 5 shows the tractor drawbar rigidly attached to the tractor frame.

The invention is disclosed in connection with a row crop tractor of a well known type comprising a narrow longitudinally extending body portion 10 supported at the front on a steering truck 12 and at the rear on a transversely extended rear axle structure 13 carried on the traction wheels 14, which span a plurality of plant rows. A tractor of this type provides the space of one or more plant rows between each side of the body and the tread line of the traction wheel on that side. The truck 12 has a vertical standard mounted in the front end of the tractor body which is connected by suitable gearing to a steering shaft 12ª having the usual steering wheel 11 adjacent the operator's station for guiding the tractor.

In the present instance the beet harvesting unit is located so that the frame of the unit is mounted underneath the tractor in such a manner that the center line of the beet lifting device is offset from the center line of the tractor to the right and with the shovels positioned to the rear of the center line of the rear axle structure. The harvesting unit is trailed from a transverse supporting member 15 which is mounted on the drawbar 16 of the tractor, which is mounted in reverse position, as shown.

The beet harvesting implement comprises a narrow, longitudinally extending, horizontal frame 17, which is positioned in parallel relation to the tractor body. This frame preferably consists of side bars 18 and 19 extending rearwardly and upwardly, connected together by a center brace 20 which is also the support for the rolling coulter shank yokes 21, which may be adjusted vertically and horizontally. It is also understood that these shank yokes may be replaced with the conventional coulter shanks, which may be adjusted vertically and horizontally, and also with means to pivot the coulters about a vertical axis. The purpose of the rolling coulter blades 22 is to cut through the large leaves of the beets, forcing them on the outside of the standards of the puller blades. The implement may be used with or without the rolling coulters. The coulter shank yokes are adjustable in a vertical and horizontal direction by means of the clamps 23 mounted on the center brace 20.

The upwardly extended parts of the side bars 18 and 19 are connected together by the rear frame angle 24 which is the support for the standards 25, to which are bolted the puller blades 26. It is also to be understood that this may be a casting. The standards 25 may be adjusted horizontally in the rear frame angle by means of the clamp bolts 27, so that the puller blades may be adjusted in and out to meet various soil conditions and variable sizes of beets. The standards are locked in position by means of set screws 28 positioned in the rear frame angle. To further adjust the puller blades and to also take some of the strain from the standards, standard adjusting links 29 comprising two threaded links 30 and 31 are connected by a turnbuckle 32. The threaded front link 30 is bolted to the right frame side bar at the front, and the rear link 31 is clamped to the standard 25 by a clamp 32ª. This permits the standards to be adjusted forwardly and rearwardly to provide for the suction of the blades in various soil conditions.

On the left side the adjusting link 29 is fastened to a rearwardly and upwardly extending brace 33, which is connected to the center brace 26 and to the rear frame angle 24. The parts 30, 31 and 32, and 32ª are similarly connected on the left side, as they are on the right side.

The front end of the frame 17 is pivotally supported on the transverse supporting member 15, which is loosely mounted in the angle supporting brackets 34, which are bolted to the drawbar 16 at each side. To support the side frame bar 18 on the right and the transverse supporting member 15 which partially overhangs, a spacer 35 and a brace 36 are mounted on the member 15 and securely fastened to supporting bracket 34. On the left side, a spacer 37 and a clamping collar 38 are used to position the side frame member 19, as shown.

In order to vertically adjust the front end of the frame 17 to obtain various digging depths for the puller blades, a transverse U-shaped rockshaft 43 is horizontally supported from beneath the frame 10 of the tractor by the support 44 securely fastened to the left side of the tractor and on the right hand side by the combination support and adjusting quadrant 41, which is also securely fastened to the tractor frame.

By means of the drawbar adjusting lever 42 securely fastened to the rockshaft 43, and the adjustable links 40 pivotally connected to the ends of the rockshaft and to the angle supporting brackets 34 fastened to the drawbar 16, the drawbar 16 may be adjusted vertically by means of the lever and the notches in the quadrant about its pivot point 39, which is located on the drawbar pivot plate 45 mounted on the rear axle 13 of the tractor. The front end of the drawbar may also be rigidly connected to the frame 10 of the tractor and adjusted by means of the holes in the adjustable links 40 to provide for various soil conditions, as shown by Figure 5.

To raise and lower the rear end of the implement frame 17 about its transverse axis 15, a rear transverse rockshaft 46 is mounted in a left hand bearing support 47 and a right hand bearing support 48. These bearing supports are securely fastened to the upper end of the drawbar brace plates 49, which are mounted on the rear axle 13 of the tractor.

To the rear transverse shaft 46 two forked cranks 50 are securely attached. These cranks are in alignment with the frame members 18 and 33. Pivoted guide members 51, through which the upper ends of lifting rods 52 are permitted to slide when pressure is exerted on the puller blades, are mounted in the forked cranks. The lifting rods 52 are pivotally attached at their lower ends to the frame members 18 and 33, and are slidably mounted at their upper ends in the pivoted guide members 51. At the lower portions of the lifting rods 52 are attached the lower adjustable clamps 53 to adjust the compression of the pressure springs 54. At the upper ends of the lifting rods are attached the upper adjustable clamps 55 to limit the depth of the lifting rods 52 and also to prevent the lifting rods 52 from sliding out of the pivoted guide members 51.

A standard adjusting lever 56 is mounted securely to the rear rockshaft 46 on the right hand side to raise and lower the frame 17 of the implement about its transverse axis 15. In order to lock the rockshaft in various positions by means of the adjusting lever 56, a quadrant 57 is securely fastened to the right hand bearing support 48.

The crank arm 58 is securely fastened to the rear transverse rockshaft intermediate the two fork cranks to which is pivoted a connecting link 59. To the front end of the link is connected a counter-balancing spring 60, so that in raising and lowering of the frame 17, the weight of the frame may be counter-balanced, making it easier for the operator to handle. A threaded eye bolt 61 is attached to the front end of the spring, the threaded portion of the bolt passing through an inwardly bent portion of the extended portion of the front end of the right hand bearing support 48. The tension of the counter-balancing spring may be adjusted by a nut 62 threaded on the eye bolt. The counter-balancing spring 60 may be attached wherever it is most desirable.

With the construction so far described, it will be evident that the frame 17 will be capable of an upward or floating movement, and that such movement will be confined within the vertical longitudinal planes between which the frame lies, the links being such that lateral movement of the frame with respect to the tractor is prevented. Such guiding movements of the implement laterally as are necessary during operation are imparted thereto by steering movements of the tractor itself.

The construction and arrangement above described will, therefore, provide an implement construction especially adapted to be positioned at one side of the longitudinal median line of a row crop tractor and to be guided by movements of the tractor while capable of independent movement vertically.

During such movement, the frame will be maintained in a substantially horizontal position and the puller blades will at all times be maintained at a predetermined operating depth by means of the front and rear set levers, or by attaching adjustable links 40 rigidly to the frame 10 and adjusting solely by the rear set levers when operating.

In the operation of this implement after the implement is in place and the rear wheels of the tractor have been so positioned on the rear axle 63 that the wheels will run between rows, the puller blades are guided along the row to be lifted by guiding the tractor alongside the row. In order to maintain the frame 17 horizontal while digging, the front drawbar set lever may be adjusted to lower the drawbar or it may be further lowered by the adjusting links 40. This may also be used to obtain a greater digging depth.

The rear set lever is operated from the driver's seat and is used to raise and lower the puller blades to and from their operating position. Various digging positions may be thus obtained. The front drawbar set lever may be also operated from the driver's seat.

It has been found that with implements connected as disclosed there is a tendency for the ground engaging tools, as they are pulled by the tractor, to cause side draft and make the tractor hard to steer. This has been overcome by having the wheels adjustable on the rear axle, so that the forces set up by the driving wheels counterbalance the forces of the soil on ground engaging tools, so that the algebraic summation of the clockwise and counter-clockwise movement of the forces measured by the product of each force resolved parallel to the center line of the tractor by the soil engaging means and the wheels and their respective perpendicular distance to the center line of the tractor is equal to zero. These moments may be expressed in inch pounds or foot pounds so long as all the moments are calculated in the same units. By shifting the wheels on the rear axle, they may be adjusted to span a plurality of rows, and they may be adjusted so that there is no side draft caused by the soil engaging means, thus making the tractor steer straight and easily.

While the preferred construction has been described, it is possible to vary this as to details without departure from the scope of the invention as defined in the following claims.

What is claimed is:

1. In a harvesting machine for beets or like vegetables planted in rows, a wheeled frame having a rear axle structure, a forwardly positioned drawbar mounted underneath the frame and with its draft connection forward of the rear axle structure, means mounted on the said wheeled frame for adjusting the drawbar about the rear axle structure of said frame, an implement frame pivotally mounted on said drawbar, standards mounted on said implement frame, puller blades connected to said standards, said puller blades located to the rear of the rear axle structure of said wheeled frame, and means for adjusting said implement frame about its axis.

2. In a harvesting machine for beets or like vegetables planted in rows, a wheeled frame having a rear axle structure, a motor mounted on said frame for propelling said harvesting machine, a forwardly positioned drawbar pivotally mounted underneath the frame with its draft connection forward of the rear axle structure, means mounted on the said wheeled frame for adjusting the drawbar about its axis an implement frame pivotally mounted on said drawbar, standards mounted on said implement frame, puller blades connected to said standards, said puller blades located to the rear of the rear axle structure of said implement frame, and means for adjusting said implement frame about its axis.

3. In a harvesting machine for beets or like vegetables planted in rows, a tractor of the tricycle type having a frame and a rear axle mounted thereon, a forwardly positioned drawbar mounted underneath the frame and with its draft connection forward of the rear axle, means mounted on the said tractor for supporting the drawbar in position, an implement frame pivotally mounted on said drawbar, standards mounted on said implement frame, puller blades connected to said standards, said puller blades located rearwardly of said wheeled frame, and means for adjusting said implement frame about its axis whereby the puller blades may be raised and lowered.

4. In a harvesting machine for beets or like vegetables planted in rows, a tractor of the tricycle type comprising a wheeled frame and a rear axle structure, a forwardly positioned drawbar mounted underneath the frame and connected to the rear axle structure with its draft connection forward thereof, adjustable means mounted on the tractor frame for adjusting the drawbar about its connection to the rear axle structure of said frame, an implement frame pivotally mounted on said drawbar, standards mounted on said implement frame, puller blades connected to said standards, said puller blades located to the rear of the rear axle structure of said wheeled frame, and means for adjusting said implement frame about its axis whereby the puller blades may be raised and lowered.

5. In a harvesting machine for beets or like vegetables planted in rows, a tractor of the tricycle type comprising a wheeled frame and a rear axle structure mounted thereon, a forwardly positioned drawbar mounted underneath the frame and with its draft connection forward of the rear axle structure; adjustable means mounted on the tractor frame for adjusting the drawbar about the rear axle structure of said frame, said adjustable means comprising a shifting lever attached to a rockshaft and quadrant adjusting means, said quadrant mounted on the tractor frame supporting the rockshaft, pivotally adjustable links, said links connecting the rockshaft to the drawbar whereby the elevation of the drawbar may be adjusted, an implement frame pivotally mounted on said drawbar, standards mounted on said implement frame, puller blades connected to said standards, said puller blades located to the rear of the rear axle structure of said wheeled frame, and means for adjusting said implement frame about its axis whereby the puller blades may be raised and lowered.

6. In a harvesting machine for beets or like vegetables planted in rows, a tractor of the tricycle type comprising a wheeled frame and a rear axle mounted thereon, a forwardly positioned drawbar mounted underneath the frame and with its draft connection forward of the rear axle, means mounted on the said tractor for supporting the drawbar in position, an implement frame pivotally mounted on said drawbar, standards mounted on said implement frame, means for adjusting said standards laterally and longitudinally of said implement frame, puller blades connected to said standards, said puller blades located to the rear of the rear axle of said wheeled frame, and means for adjusting said implement frame about its axis whereby the puller blades may be raised and lowered.

7. In a harvesting machine for beets or like vegetables planted in rows, a tractor of the tricycle type comprising a wheeled frame and a rear axle mounted thereon, a forwardly positioned drawbar mounted underneath the frame and with its draft connection forward of the rear axle, means mounted on the said tractor for supporting the drawbar in position, an implement frame pivotally mounted on said drawbar, standards mounted on said implement frame, means for adjusting and bracing said standards longitudinally of said implement frame, puller blades connected to said standards, said puller blades located to the rear of the rear axle of said wheeled frame, and means for adjusting said implement frame about its axis whereby the puller blades may be raised and lowered.

8. In a harvesting machine for beets or like vegetables in rows, a tractor of the tricycle type comprising a wheeled frame and a rear axle mounted thereon; a forwardly positioned drawbar mounted underneath the frame and with its draft connection forward of the rear axle; adjustable means mounted on the said tractor frame for supporting the drawbar in position; an implement frame pivotally mounted on said drawbar; means for adjusting said implement frame about its axis, said means comprising a rockshaft, a lever attached to said rockshaft, a quadrant for adjusting said rockshaft, means for pivotally attaching said rockshaft to the aforesaid wheeled frame, and pivoted links connecting said rockshaft to said implement frame, whereby said implement frame may be raised or lowered.

9. In a harvesting machine for beets or like vegetables planted in rows; a tractor of the tricycle type comprising a wheeled frame and a rear axle mounted thereon; a forwardly positioned drawbar mounted underneath the frame and with its draft connection forward of the rear axle, means mounted on the said tractor frame for supporting the drawbar in position; an implement frame pivotally mounted on said drawbar; means for adjusting said implement frame about its axis, said means comprising a rockshaft, a lever attached to said rockshaft, a quadrant for adjusting said rockshaft, means for pivotally attaching said rockshaft to the aforesaid wheeled frame, and yieldable links connecting said rockshaft to said implement frame whereby said implement frame may be raised or lowered.

10. In a harvesting machine for beets or like vegetables planted in rows; a tractor of the tricycle type comprising a wheeled frame and a rear axle mounted thereon; a forwardly positioned drawbar mounted underneath the frame and with its draft connection forward of the rear axle; means mounted on the said tractor frame for supporting the drawbar in position; an implement frame pivotally mounted on said drawbar; means for adjusting said implement frame about its axis, said means comprising a rockshaft, a lever attached to said rockshaft, a quadrant for adjusting said rockshaft, means for pivotally attaching said rockshaft to the aforesaid wheeled frame, yieldable links connecting said rockshaft to said implement frame, means mounted on said yieldable links for adjusting the length of said links, and additional means mounted on said links for adjusting the yieldability of said links.

11. In a harvesting machine for beets or like vegetables planted in rows; a tractor of the tricycle type comprising a wheeled frame and a rear axle mounted thereon; a forwardly positioned drawbar mounted underneath the frame and with its draft connection forward of the rear axle; means mounted on the said tractor frame for supporting the drawbar in position, an implement frame pivotally mounted on said drawbar; means for adjusting said implement frame about its axis, said means comprising a rockshaft, a lever attached to said rockshaft, a quadrant for adjusting said rockshaft, means for pivotally attaching said rockshaft to the aforesaid wheeled frame, and counter-balancing means attached to said wheeled frame and to said rockshaft whereby said implement frame may be raised or lowered.

12. In a harvesting machine for beets or like vegetables planted in rows, a wheeled frame comprising a rear axle structure having a rear axle with wheels mounted thereon, a forwardly positioned drawbar mounted underneath the frame and with its draft connection forward of the rear axle structure, means mounted on the said wheeled frame for adjusting the drawbar about the rear axle structure of said frame, an implement frame pivotally mounted on said drawbar, standards mounted on said implement frame, puller blades connected to said standards, said puller blades located to the rear of the rear axle of said wheeled frame, means for adjusting said implement frame about its axis, and adjustable means whereby said rear wheels may be adjusted on said rear axle to conform with the lateral spacing of the rowed crops.

13. In a harvesting machine for beets or like vegetables planted in rows, a tractor of the tricycle type having a forward steering truck and a rear axle structure having a rear axle, a forwardly positioned drawbar mounted underneath the frame and with its draft connection forward of the rear axle structure, means mounted on the said wheeled frame for adjusting the drawbar about the rear axle structure of said frame, an implement frame pivotally mounted on said drawbar, standards mounted on said implement frame, puller blades connected to said standards, the plane of the center line of said standards positioned to one side of the said forward steering truck whereby the operator may drive alongside the row being pulled, means for adjusting said implement frame about its axis, and adjustable means whereby said rear wheels may be adjusted on said rear axle, locating the center line of said wheels in the same plane as the center line of the afore-mentioned standards.

14. In a harvesting machine for beets or like vegetables planted in rows, a tractor of the tricycle type comprising a wheeled frame and a rear axle mounted thereon, a forwardly positioned drawbar mounted underneath the frame and with its draft connection forward of the rear axle, means mounted on the said tractor for supporting the drawbar in position, an implement frame pivotally mounted on said drawbar, standards mounted on said implement frame, puller blades connected to said standards, said puller blades located to the rear of the rear axle of said wheeled frame, means for adjusting said implement frame about its axis, and connecting means whereby said standards are mounted laterally with respect to the center line of the tractor to conform with the lateral spacing of rowed crops.

15. In a harvesting machine for beets or like vegetables planted in rows, a tractor of the tricycle type comprising a wheeled frame and a rear axle mounted thereon, a forwardly positioned drawbar mounted underneath the frame and with its draft connection forward of the rear axle, means mounted on the said tractor for supporting the drawbar in position, an implement frame pivotally mounted on said drawbar, standards mounted on said implement frame, puller blades connected to said standards, said puller blades located to the rear of the rear axle of said wheeled frame, means for adjusting said implement frame about its axis, and means for attaching coulters to said implement frame whereby they may be adjusted vertically and horizontally.

16. A harvesting attachment for beets or like vegetables planted in rows for a tractor comprising a wheeled frame and a drawbar mounted on said tractor, means for detachably securing said attachment to said drawbar, adjustable means detachably secured to said wheeled frame for adjusting said drawbar, and additional adjustable resilient means secured to the rear housing of said wheeled frame, whereby said attachment may be raised and lowered; said attachment comprising an implement frame, standards adjustably mounted on said frame, and blades mounted on said standards.

17. In a soil engaging machine for crops planted in rows, a tractor of the tricycle type having a forward steering truck and a rear axle with wheels mounted thereon spacing a plurality of rows, means for operatively mounting soil engaging means to one side of said tractor whereby the operator may drive alongside the row to be worked, means for adjusting the position of said wheels on the aforesaid rear axle whereby the algebraic summation of the clockwise and counterclockwise moments of the forces measured by the product of each force resolved parallel to the center line of the tractor by the soil engaging means and the wheels and their respective perpendicular distance to the center line of the tractor is equal to zero.

BERT R. BENJAMIN.
JAMES MORKOVSKI.